(12) United States Patent
Kim et al.

(10) Patent No.: US 8,885,578 B2
(45) Date of Patent: Nov. 11, 2014

(54) METHOD OF TRANSMITTING MULTICAST BROADCAST SERVICE

(75) Inventors: Eunkyung Kim, Seoul (KR); Jae Sun Cha, Daejeon-si (KR); Juhee Kim, Daejeon-si (KR); Soojung Jung, Daejeon-si (KR); Hyun Lee, Daejeon-si (KR); Kwang Jae Lim, Daejeon-si (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 818 days.

(21) Appl. No.: 12/870,286

(22) Filed: Aug. 27, 2010

(65) Prior Publication Data
US 2011/0075600 A1 Mar. 31, 2011

(30) Foreign Application Priority Data

Aug. 28, 2009 (KR) .................. 10-2009-0080798
Aug. 27, 2010 (KR) .................. 10-2010-0083316

(51) Int. Cl.
*H04W 4/06* (2009.01)
*H04W 72/00* (2009.01)

(52) U.S. Cl.
CPC .................................. *H04W 72/005* (2013.01)
USPC ......................................................... 370/329

(58) Field of Classification Search
USPC ................................................. 370/312, 329
See application file for complete search history.

(56) References Cited

U.S. PATENT DOCUMENTS

| | | | |
|---|---|---|---|
| 2008/0175237 A1* | 7/2008 | Kim ............................. | 370/389 |
| 2010/0202340 A1* | 8/2010 | Josiam et al. ................. | 370/312 |
| 2010/0202371 A1* | 8/2010 | Josiam et al. ................. | 370/329 |
| 2010/0272000 A1* | 10/2010 | Chen et al. .................... | 370/312 |
| 2011/0182229 A1* | 7/2011 | Park et al. ..................... | 370/312 |
| 2012/0155367 A1* | 6/2012 | Kim et al. ..................... | 370/312 |
| 2012/0182958 A1* | 7/2012 | Pelletier et al. ............... | 370/329 |
| 2013/0028165 A1* | 1/2013 | Kim et al. ..................... | 370/312 |

FOREIGN PATENT DOCUMENTS

| | | |
|---|---|---|
| EP | 1 718 096 | 11/2006 |
| KR | 10-2008-0085318 | 9/2008 |
| KR | 10-2009-0048761 | 5/2009 |

OTHER PUBLICATIONS

Eunkyung Kim et al., "E-MBS Support in IEEE 802.16m (E-MBS)," *IEEE 802.16 Broadband Wireless Acess Working Group*, Aug. 29, 2009, pp. 1-8.
Eunkyunk Kim, et al., E-MBS Support in IEEE 802.16m (E-MBS), IEEE 802.16 Broadband Wireless Access Working Group, Aug. 28, 2009.

\* cited by examiner

*Primary Examiner* — Donald Mills
*Assistant Examiner* — Henry Baron
(74) *Attorney, Agent, or Firm* — Staas & Halsey LLP

(57) ABSTRACT

A method of a base station transmitting Multicast Broadcast Service (hereinafter referred to as MBS) includes transmitting MBS configuration information, including information about an MBS region which is a resource region to which MBS-related information is allocated and information about an MBS MAP, to a terminal and transmitting MBS data to the terminal through the MBS region. The information about the MBS region includes location information and a transmission parameter of the MBS region. The MBS MAP includes an MBS configuration information change indication which indicates whether the MBS configuration information is expected to change from first MBS configuration information to second MBS configuration information. MBS is effectively and persistently managed in a mobile wireless communication system supporting MBS.

18 Claims, 9 Drawing Sheets

METHOD OF TRANSMITTING MULTICAST BROADCAST SERVICE

This application claims the benefit of priority of Korean Patent Application No. 10-2009-0080798 filed on Aug. 28, 2009 and Korean Patent Application No. 10-2010-0083316 filed on Aug. 27, 2010, which are incorporated by reference in their entirety herein.

BACKGROUND OF THE INVENTION

1. Field of the Invention

The present invention relates to wireless communication and, more particularly, to a method of transmitting and receiving multicast broadcast service.

2. Related Art

Multicast/Broadcast Service (hereinafter referred to as 'MBS') is a point-to-multipoint communication system in which one source transmits data packets to a plurality of destinations at the same time. Broadcast service refers to service in which data packets are transmitted to all users, and multicast service refers to service in which data packets are transmitted to a specific group. MBS is used in IEEE 802.16e which is one of mobile communication standards and referred to as MultiCast BroadCast Service (MCBCS) in WiMAX. The MBS is referred to as Evolved-MBS (E-MBS) in an IEEE 802.16m standard evolved from the IEEE 802.16e standard. Meanwhile, in the WCDMA standard of the 3rd Generation Partnership Project (3GPP), a standard called Multimedia Broadcast Multicast Service (MBMS) was established in Rel. 5 and is called Evolved MBMS (E-MBMS) after Rel. 8 which is referred to as Long Term Evolution (LTE). The terms named in the respective standards are slightly different, but standardization activities for them are being actively performed for the purpose of providing broadcasting communication convergence service.

FIG. 1 illustrates a frame structure for transmitting MBS data.

Referring to FIG. 1, a radio frame is composed in the unit of a superframe. One superframe consists of four frames. Each of the frames consists of a plurality of subframes. The first subframe of each superframe includes a Superframe Header (SFH). The SFH refers to the unit in which several frames are transmitted and chiefly includes the essential system parameter or system configuration information. The SFH includes a Primary Superframe Header (P-SFH) and can periodically include a Secondary Superframe Header (S-SFH). The P-SFH is chiefly transmitted every superframe. The P-SFH defines whether an S-SFH has been transmitted and changed, and the P-SFH is transmitted in a cycle of one or more superframes.

MBS has specific Quality of Service (QoS) and one service flow. The MBS is mapped to several terminals and supplied thereto at the same time. A terminal which receives MBS configures a corresponding parameter and service flow in order to receive corresponding service. A base station which provides MBS belongs to at least one MBS zone, and it is distinguished by an MBS zone ID. In each MBS zone, common contents are distinguished by a multicast STID (hereinafter referred to as E-MBS ID) and transmitted using a service flow. The E-MBS ID is a common ID which is assigned to a terminal in order to receive MBS. The MBS contents have the same channel (or service Flow ID (FID)). The FID is paired with a corresponding E-MBS ID for every MBS connection.

A single terminal can be assigned several FIDs. MBS contents belonging to one E-MBS ID are distinguished by FIDs and transmitted. In an MBS zone, a user must be able to receive MBS irrespective of whether the user is in a connected state or an idle state. It means that additional registration or procedure is not required in order to receive MBS. Further, when a terminal moves from one MBS zone to the other MBS zone, the terminal must be able to consistently receive MBS irrespective of a mode of the terminal.

When taking an MBS-unique frame structure and various parameters into consideration, there is a need for a frame structure and a control channel structure for efficiently transmitting MBS and detailed technology regarding an MAP message.

SUMMARY OF THE INVENTION

It is, therefore, an object of the present invention to efficiently provide MBS through an efficient MBS frame and control channel structure for providing MBS and the design of an MBS MAP message.

In accordance with an aspect of the present invention, there is provided a method of a base station transmitting Multicast Broadcast Service (hereinafter referred to as MBS), including transmitting MBS configuration information, including information about an MBS region which is a resource region to which MBS-related information is allocated and information about an MBS MAP, to a terminal and transmitting MBS data to the terminal through the MBS region. The information about the MBS region includes location information and a transmission parameter of the MBS region, and the MBS MAP includes an MBS configuration information change indication which indicates whether the MBS configuration information is expected to change from first MBS configuration information to second MBS configuration information.

The MBS configuration information includes the location information of the MBS region and information about modulation and coding of the MBS region.

The information about the MBS region further includes locations and transmission parameters for a plurality of MBS regions.

The information about the MBS MAP includes information to inform whether the MBS MAP is expected to be transmitted and information about a transmission location of the MBS MAP, and the terminal determines whether to decode the MBS MAP using the information to inform whether the MBS MAP is expected to be transmitted.

The MBS configuration information is included in a superframe header (SFH).

The MBS MAP indicates at least one next MBS MAP.

In accordance with another aspect of the present invention, there is provided a method of receiving MBS, including receiving an MBS MAP, including information about an MBS region which is a resource region to which MBS-related information is allocated and MBS control information, including information about the MBS MAP, from a base station and receiving MBS data to the base station through the MBS region. The information about the MBS region includes location information and a transmission parameter of the MBS region, and the MBS MAP includes an MBS control information change indication which indicates whether the MBS control information is expected to change from first MBS control information to second MBS control information.

The method further includes receiving the second MBS control information from the base station.

The base station belongs to at least one MBS zone, the MBS data correspond to a flow identifier (Flow ID; a FID) of specific contents, and the FID corresponds to the at least one MBS zone.

The MBS MAP indicates an MBS MAP included in the second MBS control information.

The location information about the MBS region indicates a subframe, including the MBS region, within a superframe, and the information about the MBS MAP indicates a subframe, including the MBS MAP, within the superframe.

The location information about the MBS region and the information about the MBS MAP have a bitmap form.

The MBS is received through a plurality of carriers, the MBS control information is received through a first carrier, and the MBS control information further includes at least one of information about an MBS region of the first carrier and information about an MBS region of a second carrier.

The MBS control information further comprises information about an MBS MAP of the second carrier.

The MBS MAP further comprises an ID of the MBS, providing the MBS data, and an FID of the MBS data.

The MBS data is specified by a combination of the ID of the MBS and the FID of the MBS data.

The MBS configuration information is system information about the base station, and the MBS configuration information further comprises an indicator indicating that the MBS region is used for any one of unicast, MBS, and unicast/multicast broadcast service.

The MBS configuration information is transmitted on a superframe immediately before a start location of an MBS scheduling interval (MSI).

MBS is effectively and persistently managed in a mobile wireless communication system supporting MBS.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Figure 1:
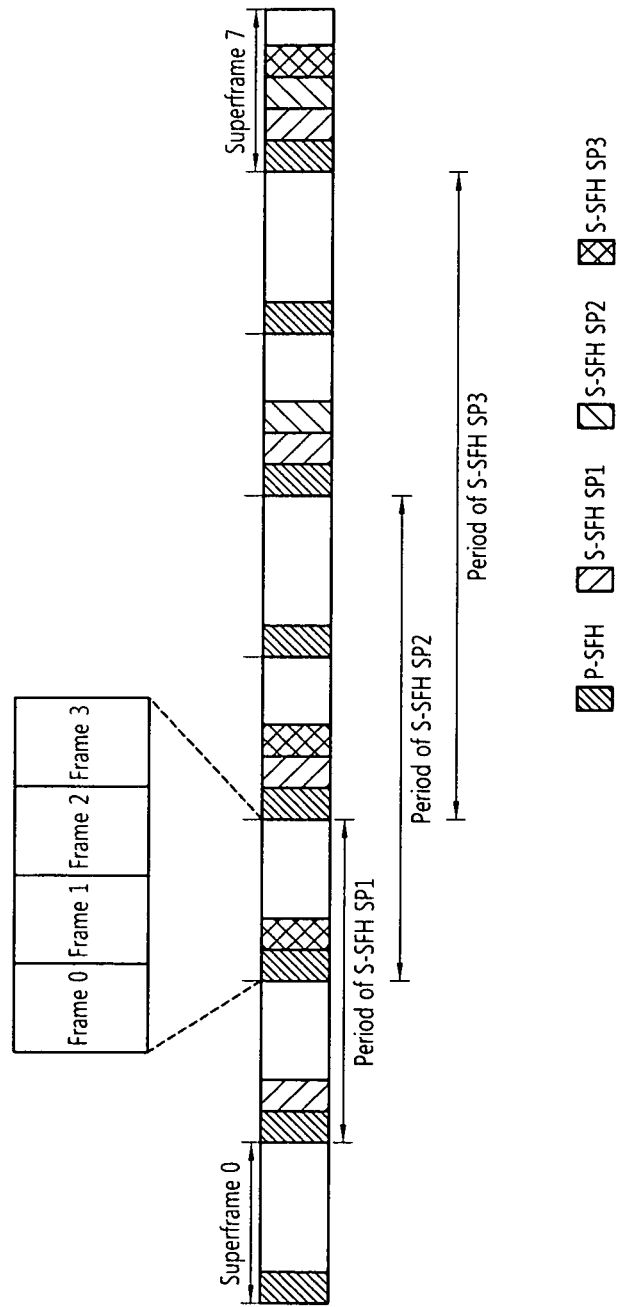
FIG. 1 shows a frame structure for transmitting MBS data.

Hereinafter, some embodiments of the present invention are described in detail with reference to the accompanying drawings in order for those skilled in the art to be able to readily implement the invention. However, the present invention may be modified in various different ways and are not limited to the following embodiments. In order to clarify a description of the present invention, parts not related to the description are omitted, and the same reference numbers are used throughout the drawings to refer to the same or like parts. Further, a description of parts which can be easily understood by those skilled in the art is omitted.

Furthermore, when it is said that any part "includes (or comprises)" any constituent element, it means that the corresponding part may further include other constituent elements unless otherwise described without excluding other constituent elements.

In this specification, a terminal may refer to a Mobile Station (MS), a Mobile Terminal (MT), a Subscriber Station (SS), a Portable Subscriber Station (PSS), a User Equipment (UE), an Access Terminal (AT) or the like and may include some or all of the functions of the MS, the MT, the SS, the PSS, the UE, the AT.

In this specification, a BS may refer to an Access Point (AP), a Radio Access Station (RAS), a Node B, an evolved NodeB (eNodeB), a Base Transceiver Station (BTS), a Mobile Multihop Relay (MMR)-BS, etc. and may include some or all of the functions of the AP, the RAS, the Node B, the eNodeB, the BTS, or the MMR-BS.

MBS control information for providing MBS is described below.

I. MBS Control Information (1) MBS Region

An MBS region is a physical resource region to which MBS-related information (e.g., control information or MBS burst) is allocated. The MBS region has the same system transmission parameter of a Medium Access Control (MAC) layer and a physical (PHY) layer. One or several MBS data may be transmitted on one frame, or one MBS data may be transmitted on one or several frames. Location information about the MBS region can be transmitted through common system information, such as a System Configuration Descriptor (SCD), or MBS-specific configuration information, such as an MBS configuration message.

(2) MBS Configuration Message

The MBS configuration message is configuration information for configuring information about an MBS region, whether an MBS MAP has been transmitted, the transmission location of an MBS MAP, and the transmission parameters of an MAC layer and a PHY layer pertinent to an MBS MAP. A terminal can configure MBS using an MBS configuration message and then receive the MBS. For example, the MBS configuration message can include MBS region-related information, such as location information about an MBS region and the burst size and transmission parameter of an MBS MAP. The MBS configuration message can further include an indicator, indicating whether the MBS region transmits only unicast data, only MBS data, or a combination of unicast/multicast broadcast service data.

The MBS configuration message can be transmitted once for a certain period of time (e.g., at least once every MSI) or can be transmitted at least once for several MSIs. The MBS configuration message can include information indicative of a next MSI or an MBS MAP until a next MBS configuration message is transmitted and indicative of a location where a next MBS configuration message or an MSI will be transmitted. The MBS configuration message may be the same as an MAC header or an MAC message structure and may be included in an SFH. In case in which MBS needs not to be configured in each superframe, an SFH may not include an MBS configuration message. Hereinafter, in order to unite descriptions, it is assumed that an SFH includes an MBS configuration message.

An MSI includes a superframe and at least one SFH which defines a transmission parameter and whether an MBS MAP has been transmitted. An SFH includes at least one of information about whether all MBS MAPs within an MSI have been transmitted, a transmission parameter, information about an MBS region. The transmission parameter included in the S-SFH is as follows; i) whether an MBS MAP has been transmitted, ii) whether an emergency service message has been transmitted (i.e., in case where MBS traffic for emergency service must be transmitted to a terminal, whether emergency service exists in an SFH can be informed, iii) the transmission locations of an MSI and an MBS MAP and the transmission parameter of the MBS MAP in case where only an MBS MAP indicates only a next MBS MAP, and iv) an MSI, the transmission parameter of at least one MBS MAP, etc. in case where an MBS MAP indicates all MBS MAPs within an MSI.

The above can be represented as in the following table.

Referring to Table 1, an S-SFH include information about whether an MBS MAP has been transmitted and a transmission parameter. An E-MBS IE indication is an indicator indicating whether an MBS MAP has been transmitted. The E-MBS IE indication can exist variably according to the number of MBS zones managed by a base station. In the case in which the E-MBS IE indication is individually managed in each MBS zone, the E-MBS IE indication can inform whether an MBS MAP corresponding to the MBS zone has been transmitted. Further, even in case where an MBS message for emergency service has been transmitted, the E-MBS IE indication can also inform the existence of an emergency service message. When a base station informs a terminal of the length of an MSI, the terminal can calculate a point of time at which a next SFH will be transmitted. Accordingly, the terminal can efficiently receive a next SFH. An SFH may exist in the P-SFH in the parameters of Table 1, but the SFH has been assumed to exist in the S-SFH. Accordingly, whether the S-SFH has been transmitted is indicated in the P-SFH.

Table 2 shows the structure of an S-SFH which further includes MBS region information in the MBS configuration message.

TABLE 1

| Syntax | Size(bit) | Notes |
|---|---|---|
| S-SFH IE format( ) { | | |
| ... | | |
| MBS MAP IE Indication [bitmap] | [TBD] | if (Length == 1) 0b0: no information of MBS MAP 0b1: S-SFH IE includes the information of MBS MAP If (Length >1) Indicates whether there is MBS MAP of the corresponding MBS Zone ID. Bitmap (B) = E-MBS ID % L (length of bitmap) If the bitmap is set, MBS MAP related information for the MBS Zone ID may be included in the current S-SFH IE. Otherwise, there is no MBS MAP. Thus, the AMS does not decode the following MBS MAP. |
| Existence of Emergency Service Message | 1 | 0: indicate that there is no Emergency Service Message(s) in MBS region. 1: indicates that there is Emergency Service Message in an MBS region |
| If (one of the bitmaps of the MBS MAP Indication is set? \|\| Existence of Emergence Service Message == 1) { | | |
| MBS Interval | [TBD] | Cycle of MSI, location of the next MBS MAP in the unit of superframe |
| Frame offset | 2 | Frame location of the first MBS MAP 0b00: current frame 0b01: (current frame + 1)$^{th}$ frame 0b10: (current frame + 2)$^{yth}$ frame 0b11: (current frame + 3)$^{th}$ frame |
| Subframe offset | 3 | Subframe number in the frame of first MBS MAP 0b000: 1$^{st}$ subframe of the frame ... 0b111: (7 + 1)$^{th}$ subframe of the frame |
| Transmission Information | Variable | Transmission information (MCS) of MBS MAP, which may include the following information: Modulation Repetition FEC Type can be located in the MBS MAP |
| Resource Information | [TBD] | Indicates the MBS MAP region |
| } | | |
| ... | | |
| } | | |

TABLE 2

| Syntax | Size (bits) | Notes |
| --- | --- | --- |
| S-SFH IE ( ) { ... | | |
|     Region Length | [TBD] | 0: no MBS region in the superframe |
| | | >0: the length of a superframe bitmap |
|     if (Region Length > 0) { | | |
|         Superframe Bitmap | [TBD] | Size is the same as region length |
| | | 1: multicast is included in the superframe |
| | | 0: unicast only in the superframe |
|         Frame Bitmap | 4*(the number of bits set in the superframe bitmap) | Maximum length = (the number of frames in an superframe) * (the length of superframe); Length = (the number of frames in superframe) * (the number of bits set in the superframe bitmap) |
| | | 1: multicast is included in the frame |
| | | 0: unicast only in the frame |
|         Subframe Bitmap | (the number of subframes in frame) *(the number of bits set in frame bitmap) | Maximum length = (the number of subframes in frame) * (Max. length of frame bitmap) Length = (the number of subframe in frame) * (the length of a frame bitmap) |
| | | 1: multicast is included in the subframe |
| | | 0: unicast only in the frame |
|         MBS MAP Indication | 1 | indicates whether MBS MAP is addressed or not in this SF |
|     if(MBS MAP indication is set) | | |
|         Frame Index | 2 | Frame location of the first MBS MAP message |
| | | 0b00: 1st frame |
| | | 0b01: 2nd frame |
| | | 0b10: 3rd frame |
| | | 0b11: 4th frame |
|         Subframe Index | 3 | Subframe location in the frame of the first MBS MAP message |
| | | 0b000: 1st subframe of frame |
| | | . . . |
| | | 0b111: 8th subframe of frame |
|         MCS | [4] | MCS for the first MBS MAP message Depends on supported modes, 16 modes |
|         Resource Information | [TBD] | Region information of the first MBS MAP message |
|         } | | |
|     } | | |
| ... | | |
| } | | |

(3) MBS MAP

The MBS MAP includes information about whether MBS data have been transmitted, a resource location to which the MBS data are allocated, and the system transmission parameter of the MBS data, such as MAC and PHY. The MBS MAP can have the structure of an MAC header, an MAC message, or a control channel. At least one MBS MAP exists in each MBS Scheduling Interval (MSI). The MBS MAP includes information about an MBS burst until a next MSI or a next MBS MAP is transmitted and can include information about a next MSI or a location where a next MBS MAP will be transmitted. Location information about an MBS MAP can be transmitted through common system information, such as a system configuration descriptor AAI_SCD, or MBS-specific configuration information, such as an MBS configuration message.

The MBS MAP includes MBS-related control information change indication. The MBS-related control information change indication indicates that there will be a change in various parameter values (hereinafter referred to as MBS-related control information) included in an MBS configuration message at a next point of time. The MBS-related control information change indication has 1 bit and can indicate 'change' or 'no change'. In case where the MBS-related control information change indication indicates 'change', MBS-related control information is changed, and a base station transmits next MBS-related control information according to the changed parameter to a terminal. In response thereto, the terminal decodes the next MBS-related control information. However, in case where the MBS-related control information change indication does not indicate 'change', MBS-related control information is not changed, and a terminal operates on the basis of previously stored MBS-related control information and does not decode next MBS-related control information. A terminal can determine a point of time at which changed MBS-related control information will be received through the MBS-related control information change indication. Accordingly, a terminal can reduce overhead that it must receive the same MBS-related control information each time.

Regarding the MBS zone, the MBS MAP can be individually transmitted every MBS zone which is managed by a base station or can be transmitted as an integrated one for some or all of MBS zones. In the case in which MBS region information and a parameter within the MBS zone are defined, one MBS MAP includes at least one E-MBS ID because at least one E-MBS ID exists within the MBS zone. Meanwhile, MBS regarding at least one contents is possible within one E-MBS ID, and at least one service flow identifier (FID) to distinguish contents can exist within one E-MBS ID. Accordingly, an MBS MAP corresponding to one E-MBS ID includes at least one FID. That is, an E-MBS ID and an FID are paired to distinguish MBS contents, and a terminal can acquire corresponding contents information on the basis of the pair.

In relation to the MBS region, the MBS MAP can indicate only one MBS region. In this case, the MBS MAP exists whenever each MBS region is transmitted. In an alternative, the MBS MAP may indicate all MBS regions until a next MBS MAP is transmitted. In another alternative, the MBS MAP may indicate only an MBS region at a location which is the closest to the MBS MAP. If the MBS MAP indicates only one MBS region, the MBS MAP includes at least one of the location of an MBS region, the transmission parameters of MAC and PHY layers, the start location of a next MBS MAP or a next MSI, and an additional transmission parameter.

The MBS MAP can include all pieces of information regarding an MBS region at a time or can include all pieces of information regarding an MBS region on a contents basis. For example, the MBS MAP can include information about the transmission location and the transmission parameter of first contents, and the first contents can include information about the transmission location and the transmission parameter of second contents to be next transmitted.

An example of the information included in the MBS MAP is listed in the following table.

TABLE 3

| Syntax | Size(bit) | Description/Notes |
|---|---|---|
| MBS MAP format( ) { | | |
| # of MBS Zone ID | [TBD] | # of MBS Zone ID included in the MBS MAP IE |
| for (i=0;i<# of MBS Zone ID; i++) { | | |
| MBS Zone Identifier | [7] | MBS Zone Identifier |
| # of E-MBS ID | [3] | # of E-MBS ID |
| for (j=0;j<# of E-MBS ID; j++) { | | |
| E-MBS ID | 12 | Multicast STID |
| # of FID | [TBD] | # of FID |
| Next MBS MAP frame offset | [TBD] | Frame location of the next MBS MAP<br>1: current frame<br>2: (current frame + 1)$^{th}$ frame<br>...<br>n: (current frame + n)$^{th}$ frame |
| Next MBS MAP IE subframe offset | 3 | Subframe number in the frame of the next MBS MAP<br>0b000: 1$^{st}$ subframe of frame<br>...<br>0b111: (7 + 1)$^{th}$ subframe of frame |
| Transmission Information | Variable | Transmission information (MCS) of the next MBS MAP, which may include the following information:<br>Modulation<br>Repetition<br>FEC Type<br>can be located in the next MBS MAP |
| for(i=0;i< # of FID; i++) { | | |
| FID | 4 | Multicast FID |
| Next MBS MAP(about FID) frame offset | [TBD] | Frame location of the next MBS MAP including FID information<br>1: current frame<br>2: (current frame + 1)$^{th}$ frame<br>...<br>n: (current frame + n)$^{th}$ frame |
| Next MBS MAP(about FID) subframe offset | 3 | Subframe number in the frame of the next MBS MAP including FID information<br>0b000: 1$^{st}$ subframe of the frame<br>...<br>0b111: (7 + 1)$^{th}$ subframe of the frame |
| FID indication | 1 | Indicates whether the MBS traffic is addressed between this MBS MAP and a next MBS MAP<br>0: no MBS traffic is addressed between this MBS MAP and a next MBS MAP<br>1: MBS traffic is addressed between this MBS MAP and a next MBS MAP |
| If (FID indication is set) { | | |
| Transmission Information | variable | Transmission information (MCS) of MBS burst, which may include the following information:<br>Modulation<br>Repetition<br>FEC Type<br>can be located in MBS burst |

TABLE 3-continued

| Syntax | Size(bit) | Description/Notes |
|---|---|---|
| PHY/MAC parameters | [TBD] | PHY parameters of MBS data channel for each service using joint coding<br>Can be located in the pre-defined location of each MBS burst |
|         } | | |
|       } | | |
|     } | | |
|   } | | |
| } | | |

Referring to Table 3, the MBS MAP can transmit pieces of information, corresponding to all MBS zones, at a time and can transmit the pieces of information every MBS zone managed by a base station. In the case in which pieces of information corresponding to all MBS zones are transmitted at a time, the MBS MAP includes a point of time at which a next MBS MAP will be transmitted and the transmission location of the next MBS MAP in the information and transmits the information. Further, the MBS MAP includes an indicator indicating whether there is information necessary for each MBS zone. The MBS MAP may inform whether a next MBS MAP has been transmitted on the basis of information about each E-MBS ID which can exist for every MBS zone and can replace the information with an indicator corresponding to an MBS zone. Since one E-MBS ID is mapped to one MBS zone, the indicator can be replaced with an indicator corresponding to the MBS zone. However, since several channels (i.e., FIDs) can exist in the E-MBS ID within the MBS zone, information necessary for transmission is included and transmitted on an FID basis. Here, an MBS burst can exist at various locations, and various transmission parameters can exist. In the case in which transmission parameters are various, the MBS MAP can include all transmission parameters. In an alternative, an MBS MAP can indicate only a location where an MBS burst is transmitted, and a transmission parameter can be transmitted through a predetermined region or a region indicated by the MBS MAP. Information necessary for each FID can also include an indicator to indicate whether the corresponding information exists in the corresponding FID. In the case in which different MBS MAPs exist in respective MBS zones, the MBS MAPs can independently exist. In an alternative, one MBS MAP can include an MBS MAP to be next transmitted.

Table 4 shows another example of information included in an MBS MAP.

TABLE 4

| Syntax | size (bits) | Notes |
|---|---|---|
| E-MBS MAP Message format ( )<br>{ | | |
| # of E-MBS ID | [TBD] | # of E-MBS Zone ID included in E-MBS MAP IE |
| for(i=0; i<# of E-MBS ID;<br>i++){ | | |
|     E-MBS ID | 12 | |
|     Next E-MBS MAP<br>    superframe offset | [TBD] | 0: current superframe<br>1: superframe number (current + 1)<br>. . .<br>n: superframe number (current + n) |
|     Next E-MBS MAP frame offset | 2 | for the E-MBS ID<br>Frame location of the next E-MBS MAP<br>0b00: 1st frame<br>0b01: 2nd frame<br>0b10: 3rd frame<br>0b11: 4th frame |
|     Next E-MBS MAP<br>    subframe offset | 3 | for the E-MBS ID<br>Subframe location in the frame of next E-MBS MAP<br>0b000: 1st subframe of frame<br>. . .<br>0b111: $(7 + 1)^{th}$ subframe of frame |
|     MCS | [4] | MCS for MBS MAP message depends on supported modes, 16 modes |
|     Resource Information | [TBD] | Region Information for the next MBS MAP message |
|     # of FID<br>    for(k=0;k<#of FID;k++){ | [TBD] | # of FIDs |
|     FID | 4 | Multicast FID for E-MBS ID |
|     Frame offset for MBS Region | 2 | for the FID<br>Frame location of the next E-MBS Region message<br>1: current frame<br>2: (current frame + 1)$^{th}$ frame<br>. . .<br>n: (current frame + n)$^{th}$ frame |

TABLE 4-continued

| Syntax | size (bits) | Notes |
| --- | --- | --- |
| Subframe offset for MBS Region | 3 | for the FID Subframe location in the frame of the next E-MBS Region message 0b000: 1st subframe of the frame ... 0b111: (7 + 1)th subframe of the frame |
| MCS | [4] | MCS for the E-MBS region of FID Depends on supported modes, 16 modes |
| Resource Information | [TBD] | Region Information of E-MBS region for the FID |
| } | | |
| } | | |

A method of indicating an MBS MAP is described below.

Figure 2:
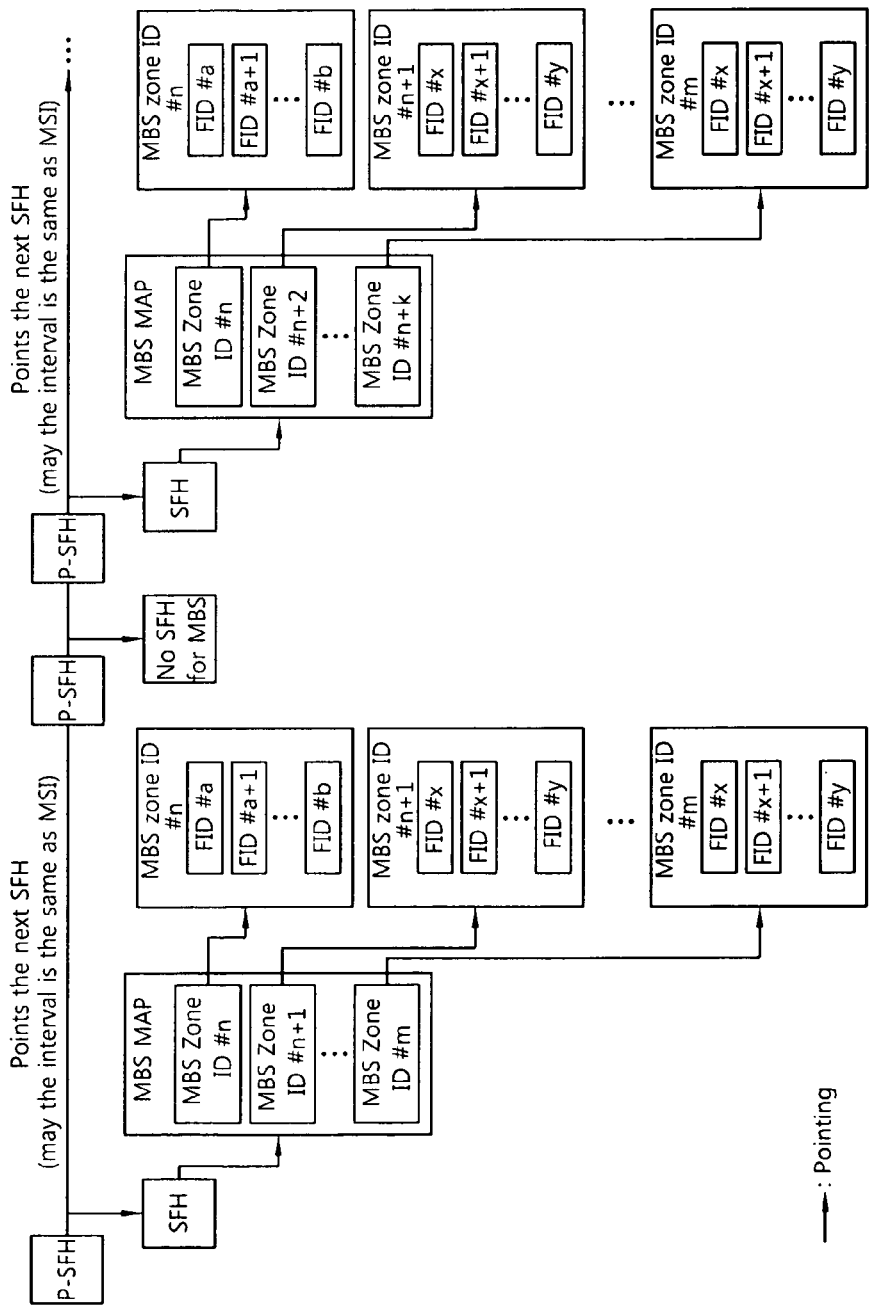
FIG. 2 is a block diagram illustrating a method of transmitting MBS configuration information according to an embodiment of the present invention.

FIG. 2 is a block diagram illustrating a method of transmitting MBS configuration information according to an embodiment of the present invention.

Referring to FIG. 2, a first P-SFH indicates whether a first S-SFH has been transmitted and a second P-SFH. Here, an interval between the first P-SFH and the second P-SFH can be the same as an MSI. Accordingly, the location of the second P-SFH can be inducted from the MSI. The first S-SFH indicates whether a first MBS MAP has been transmitted, a location where the first MBS MAP is transmitted, and the transmission parameter of the first MBS MAP. The first MBS MAP includes MBS zone IDs #n, #n+1, ..., #m (where n<m). Each of the MBS zone IDs indicates the location and transmission parameter of an MBS burst corresponding to each FID. Likewise, the second P-SFH indicates a second S-SFH and a third P-SFH. However, if MBS does not exist in a superframe to which the second S-SFH belongs, the second S-SFH does not indicate an MBS MAP.

As described above, an MBS MAP can indicate at least one MBS MAP until a next SFH is transmitted. A first MBS MAP indicated in MBS-related control information can indicate an MBS MAP which will be transmitted in the remaining parts of an MSI section. Further, only the location of an MBS region is indicated, and the transmission parameter of a burst transmitted in the MBS region may be indicated in a predefined location (e.g., the start of an MSI or a location immediately before the start of the MSI) of the MBS region or may be indicated by another message. The above transmission parameters may be indicated for every region in which data are transmitted.

Figure 3:
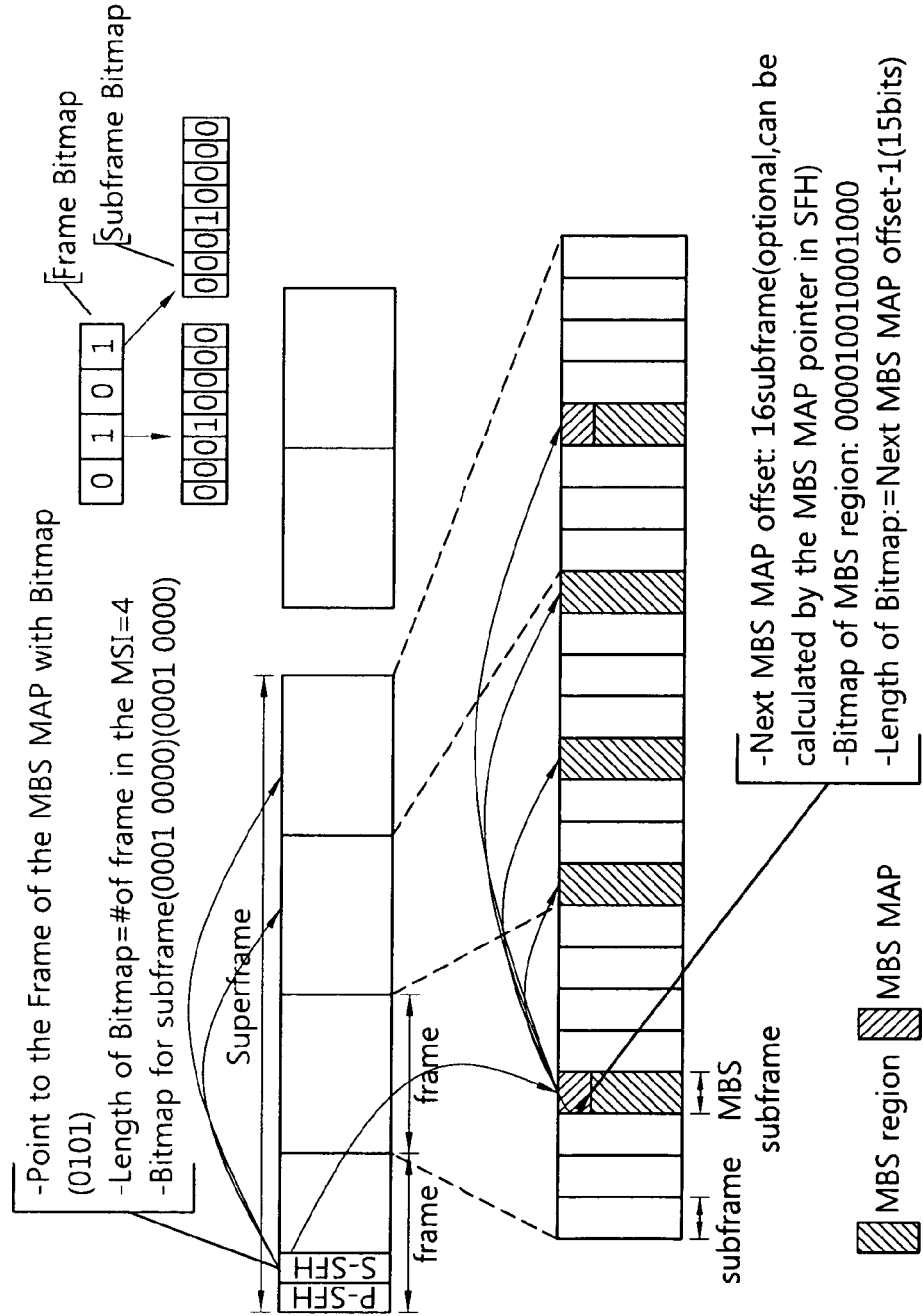
FIG. 3 shows a frame structure for transmitting MBS according to an embodiment of the present invention.

FIG. 3 shows a frame structure for transmitting MBS according to an embodiment of the present invention.

Referring to FIG. 3, an S-SFH indicates one or more MBS MAPs within an MSI. The S-SFH includes an MBS frame bitmap, a bitmap length, and an MBS subframe bitmap. The MBS frame bitmap indicates a frame, including an MBS MAP, in the form of a bitmap within a superframe to which an S-SFH belongs. For example, in the case in which an MBS MAP exists in second and fourth frames, the MBS frame bitmap becomes '0101'. If the bitmap is '0', it means that an MBS MAP does not exist in a corresponding frame. If the bitmap is '1', it means that an MBS MAP exists in a corresponding frame. The bitmap length indicates the length of an MBS frame bitmap. The MBS subframe bitmap indicates that which MBS MAP exists in which subframe within a frame in the form of a bitmap. In FIG. 2, a first MBS MAP exists in the fourth subframe of the eight subframes of a second frame, and a second MBS MAP exists in the fourth subframe of the eight subframes of a fourth frame. Accordingly, the MBS subframe bitmap becomes '0001 0000 0001 0000'.

An MBS MAP includes an MBS region bitmap. The MBS region bitmap indicates that an MBS MAP exists in which subframe of an MBS region within a frame. In FIG. 2, the fourth subframe of a second frame includes a first MBS MAP. Assuming that an MBS region bitmap starts from a fifth subframe which is next to the fourth subframe, the MBS region bitmap becomes '000010010001000'. Accordingly, an MBS MAP can indicate MBS regions before a next MBS MAP.

Although the MBS region bitmap has been illustrated to be included in an MBS MAP, the above example is only illustrative. For example, the MBS region bitmap may be included in an S-SFH.

Figure 4:
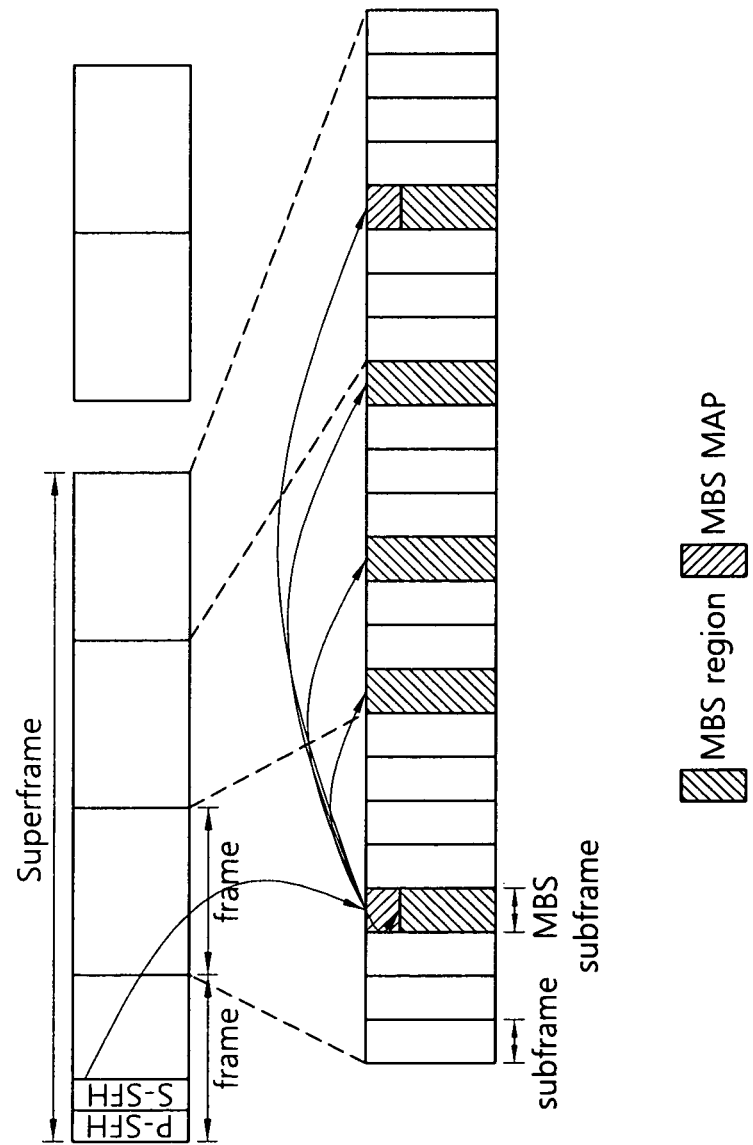
FIG. 4 shows a frame structure for transmitting MBS according to another embodiment of the present invention.

FIG. 4 shows a frame structure for transmitting MBS according to another embodiment of the present invention.

Referring to FIG. 4, a first S-SFH indicates the location of a first MBS MAP which will be transmitted after the first S-SFH is transmitted. For example, the first MBS MAP can indicate an MBS region to which an MBS burst is allocated until a next second MBS MAP is transmitted. In the method of the first MBS MAP indicating the MBS region, an offset can be used. The offset is included in an S-SFH, and the offset indicates a distance that an MBS MAP is distant from a current frame to which the S-SFH belongs. The offset includes a frame offset and a subframe offset. The frame offset can be represented using the number of corresponding bits depending on the number of frames, and the subframe offset can be represented using the number of corresponding bits depending on the number of subframes. For example, since four frames exist in a superframe, the frame offset can be represented using 2 bits. Further, since eight subframes exist in a frame, the subframe offset can be represented using 3 bits.

In FIG. 3, the first MBS MAP is located in a second frame. Assuming that the location of a first frame is 0, the frame offset indicating the first MBS MAP is 0b01. Further, the first MBS MAP is located in the fourth subframe of the second frame. Assuming that the location of the first subframe is 0, the subframe offset is 0b010. In addition, an MBS region can be indicated by an MBS region bitmap as in FIG. 2.

Figure 5:
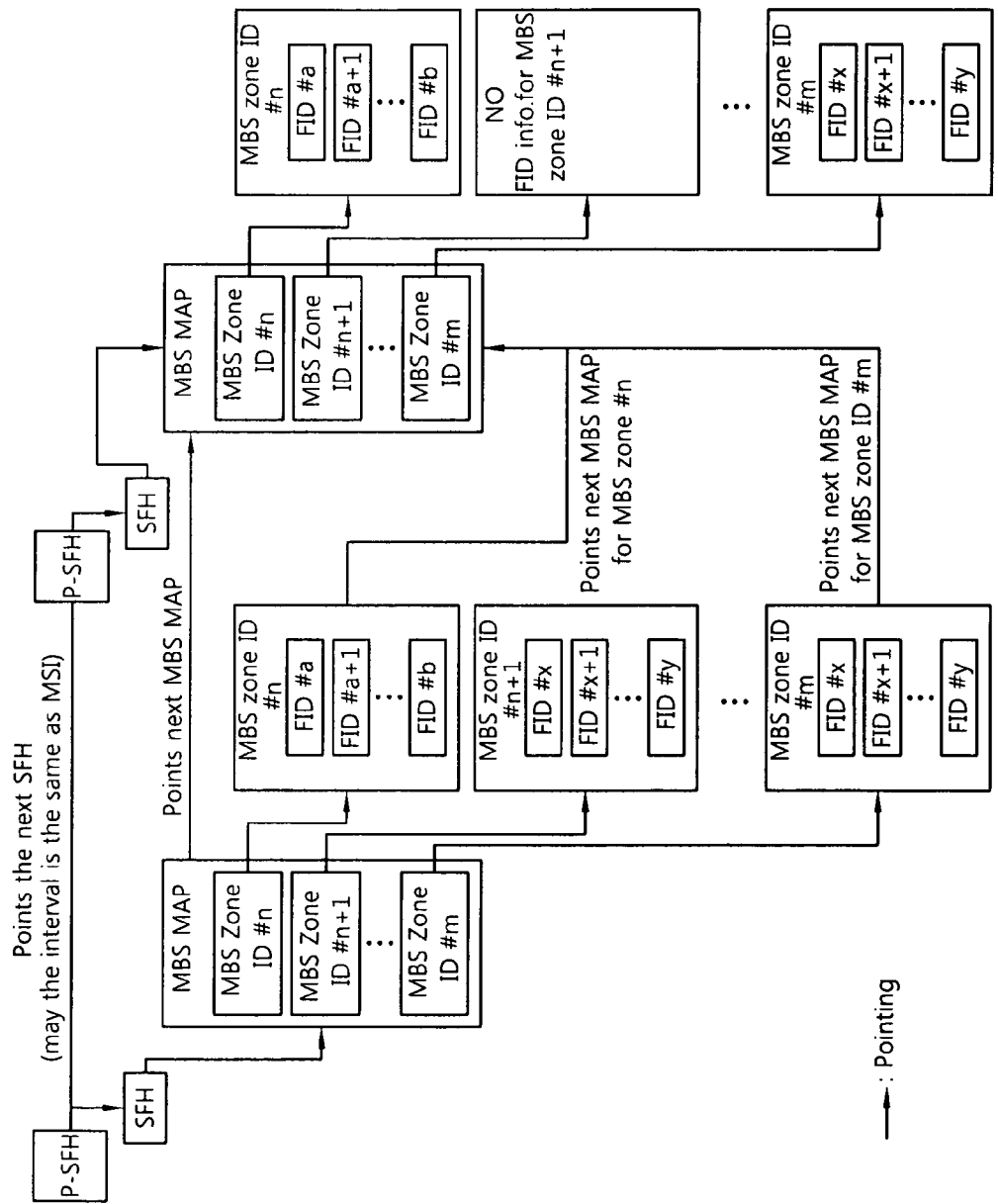
FIG. 5 is a block diagram illustrating a method of transmitting MBS configuration information according to yet another embodiment of the present invention.

FIG. 5 is a block diagram illustrating a method of transmitting MBS configuration information according to yet another embodiment of the present invention.

Referring to FIG. 5, a first P-SFH indicates a second P-SFH and a first S-SFH. Further, the first S-SFH indicates a first MBS MAP. Further, the first MBS MAP indicates the location a next second MBS MAP. That is, an MBS MAP can directly indicate whether an MBS MAP has been transmitted, a location where the MBS MAP is transmitted, and the transmission parameter of the MBS MAP within an MBS zone. MBS zone IDs of the first MBS MAP indicate whether MBS bursts corresponding to respective FIDs have been transmitted and the transmission parameters of the respective MBS bursts. Meanwhile, the FID may indicate a location where a next FID will be transmitted. In this case, every MBS MAP needs not to be received. Since only an MBS MAP corresponding to an FID can be received, power efficiency can be increased. A terminal which first joins MBS or is out of synchronization with MBS can join the MBS through an SFH or can rejoin MBS.

As described above, the MBS MAP can indicate only a next MBS MAP, and the next MBS MAP can indicate a next MBS MAP. That is, the MBS MAP indicates only an MBS MAP which is first transmitted after an SFH is transmitted, and subsequent MBS MAPs can exist in the form of a chain in which a subsequent MBS MAP is indicated by an MBS MAP just before. A terminal being served with MBS through this method can decode a desired MBS burst by calculating the location of a next MBS MAP without decoding an SFH and decoding the next MBS MAP. In accordance with this method, the overhead of an SFH can be reduced because the SFH indicates only the start location of an MBS MAP. Further, a terminal which first joins MBS or is out of synchronization while receiving the MBS can receive the MBS newly or consistently through an SFH. The location of an MBS MAP and the predefined location of an SFH help handover between MBS zones to be performed smoothly and rapidly. A fixed location of an MBS configuration message chiefly exists at a specific location of a region to which an MSI (i.e., an MBS burst) is allocated. The fixed location may be chiefly a location where an MSI is started, and it may exist in a superframe immediately before an MSI is started.

In macro diversity, an MBS burst and an MBS MAP, transmitted by different base stations, are located in the same resource region. In this case, the same service can be consistently provided to a terminal even through the terminal moves within an MBS zone. In the case in which a variety of periodicities exist, a new MSI can exist after one period, or a new MBS pattern can be defined through a new MBS MAP. Such definition is also possible a predetermined specific place, such as an SFH.

MBS configuration information may be included in one control channel, an MAC header, or an MAC management message and may be separated into two control channels, such as an MBS MAP and an SFH.

Figure 6:
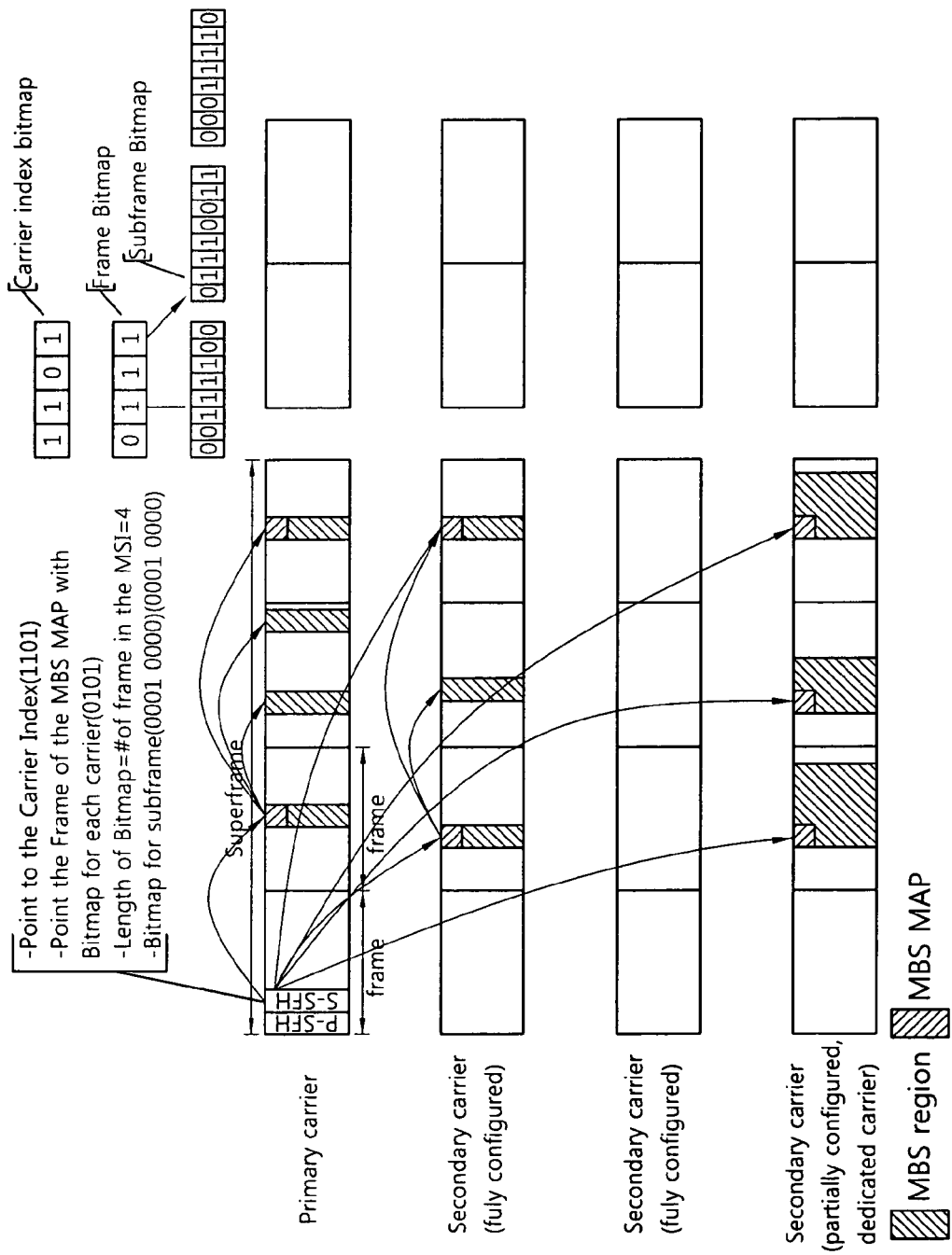
FIG. 6 shows a frame structure for transmitting MBS according to according to further yet another embodiment of the present invention.

FIG. 6 shows a frame structure for transmitting MBS according to according to further yet another embodiment of the present invention. This drawing illustrates a case in which the MBS is transmitted in a multi-carrier system. Further, this drawing illustrates a case in which a primary carrier indicates all MBS MAPs provided in the primary carrier and secondary carriers.

Referring to FIG. 6, the multi-carrier system supports one primary carrier and four secondary carriers. The primary carrier can transmit not only MBS information about the primary carrier, but also all pieces of MBS information about the secondary carriers. A P-SFH and an S-SFH exist only in the primary carrier, and the S-SFH includes MBS control information about each carrier. The S-SFH includes a carrier indicator indicative of a carrier providing MBS, the number of frames within an MSI, an MBS frame bitmap, and an MBS subframe bitmap. The number of frames within an MSI is 4.

The carrier indicator indicates whether each carrier provides MBS in the form of a bitmap. For example, a primary carrier, a first secondary carrier, and a third secondary carrier can provide MBS, but a second secondary carrier does not provide MBS. Accordingly, the carrier indicator can be represented by 1101.

Regarding a carrier having a carrier indicator set to '1', at which frame an MBS MAP will be transmitted is indicated in the form of a bitmap. Accordingly, an MBS frame bitmap can exist as many as the number in which the carrier indicator is set to '1'. In the case of FIG. 6, in the primary carrier, an MBS MAP is transmitted in the second frame and the fourth frame. Thus, the MBS frame bitmap is represented by 0101. The MBS frame bitmap is 0101 in the first secondary carrier, and the MBS frame bitmap is 0111 in the third secondary carrier.

The MBS subframe bitmap, in particular, indicates on which subframe an MBS MAP is transmitted within a frame in which the MBS MAP is transmitted in the form of a bitmap form. Accordingly, in FIG. 6, the MBS subframe bitmap is represented by '00010000 00010000'. The former eight bits indicate consecutive subframes within a second frame, and the latter eight bits indicate consecutive subframes within a fourth frame. The MBS MAP of the secondary carrier is also indicated by the S-SFH of the primary carrier, and each MBS MAP may be indicated by a previous MBS MAP.

Figure 7:
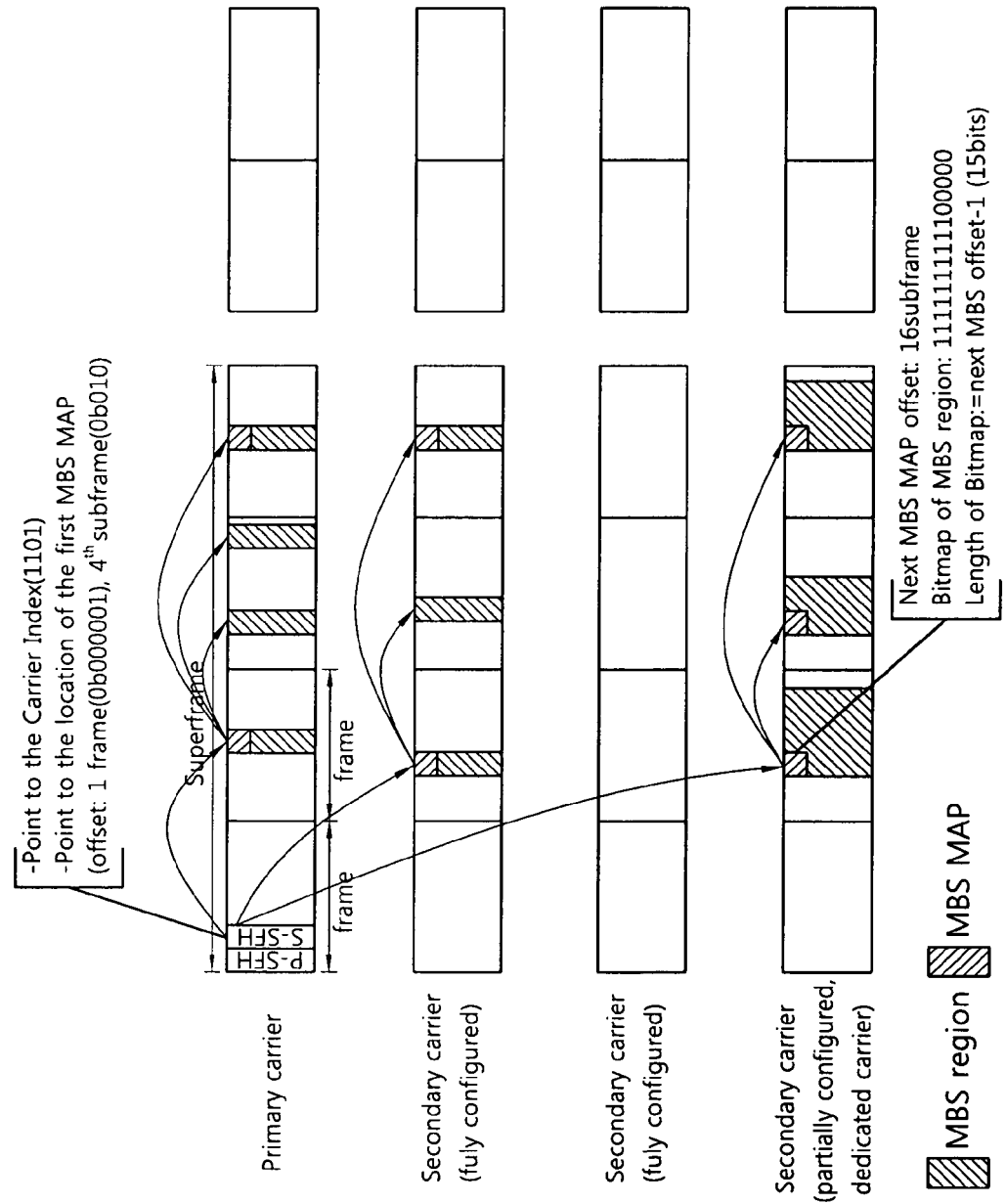
FIG. 7 shows a frame structure for transmitting MBS according to further yet another embodiment of the present invention.

FIG. 7 shows a frame structure for transmitting MBS according to further yet another embodiment of the present invention. This drawing illustrates a case in which MBS is transmitted in a multi-carrier system. Further, this drawing shows a case in which a primary carrier indicates one MBS MAP provided in the primary carrier and secondary carriers.

Referring to FIG. 7, MBS control information included in the S-SFH of a primary carrier is the same as that described with reference to FIG. 5. However, in FIG. 7, the S-SFHs of the primary carrier indicate MBS MAPs provided in the primary carrier, a first secondary carrier, and a third secondary carrier, respectively. Further, each of the MBS MAPs indicates a subframe for next MBS on a corresponding carrier. The S-SFH indicates the first MBS MAP of the primary carrier, and the first MBS MAP indicates the remaining subframes in which MBS is provided. Further, the S-SFH indicates the second MBS MAP of the first secondary carrier, and the second MBS MAP indicates the remaining subframes in which MBS is provided. Likewise, the S-SFH indicates the third MBS MAP of the third secondary carrier, and the remaining MBS MAPs are indicated so called in the form of a chain. That is, the third MBS MAP indicates a next MBS MAP, which indicates a subsequent MBS MAP.

Figure 8:
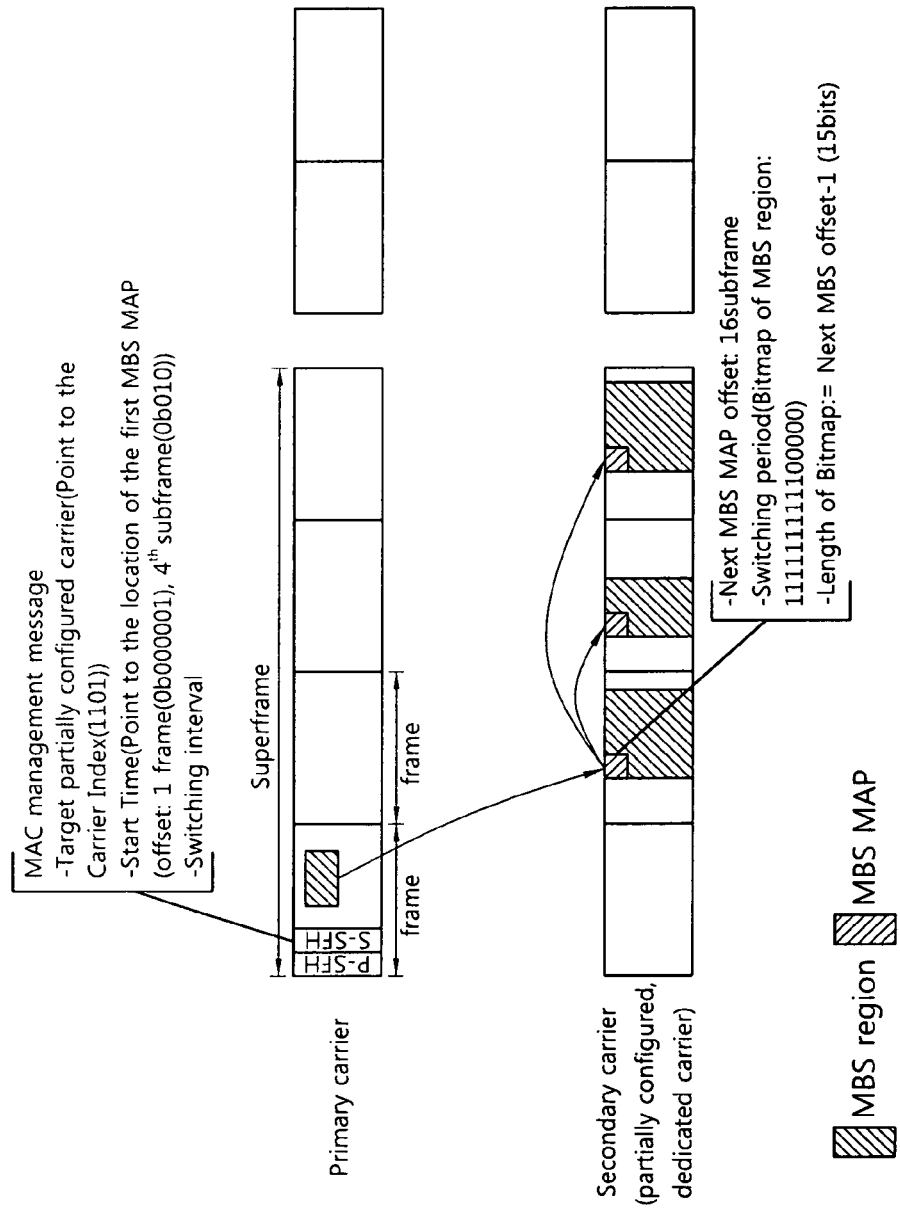
FIG. 8 shows a frame structure for transmitting MBS according to further yet another embodiment of the present invention.

FIG. 8 shows a frame structure for transmitting MBS according to further yet another embodiment of the present invention. This drawing illustrates a case in which MBS is transmitted through a dedicated channel in a multi-carrier system.

Referring to FIG. 8, a first secondary carrier (i.e., at least one of secondary carriers) is exclusively allocated to MBS. That is, the first secondary carrier is an MBS dedicated carrier. Accordingly, the first secondary carrier provides the MBS using a predetermined point of time and predetermined resources. An S-SFH or an MAC management message includes information about a switching timing from a primary carrier to an MBS dedicated carrier and the duration of the switching timing. The information about the switching timing and the duration may be transmitted through an MBS MAP, an additional control channel, an MAC header, etc. Further, a chain method of one MBS MAP indicating a next MBS MAP within an MBS dedicated carrier or a method of one MBS MAP indicating all MBS MAPs within an MSI may be used.

(4) Transmission Cycle of MBS Control Information

As described above, MBS control information is a concept, including not only an MBS configuration message and an MBS MAP, but several transmission parameters included in the MBS configuration message and the MBS MAP. The MBS control information may be transmitted on an S-SFH.

For example, the transmission cycle of MBS control information can have the same cycle as an S-SFH. In this case, a terminal can update an MBS configuration in the same cycle as other system parameters, and a point of time at which the update is applied is the same as that of other system parameters of an SFH. For example, in the case in which an SFH transmission cycle and an MBS MAP cycle have the same cycle or a certain multiple relationship, if all of or any one of other system parameters and MBS-related transmission parameters are updated, a terminal can be informed of a change schedule through one S-SFH change count or only whether a change has been made or not. When the change is made, changed information can be included and transmitted.

For another example, the transmission cycle of MBS control information may be separately given unlike the cycle of an S-SFH. In this case, a terminal can perform MBS-related update independently from other system parameters. For example, in the case in which an SFH transmission cycle and the cycle of an MBS MAP independently exist, a terminal served with MBS can receive an MBS MAP for the MBS, although there is no change in the parameter other than the MBS, and update MBS-related parameter values.

In case where a terminal joins MBS and must rejoin MBS because of out-of-synchronization with the MBS, the terminal has to wait until it receives an SFH in order to acquire the synchronization of an MBS MAP. In order to reduce the waiting time, the terminal can transmit a message, requesting to join MBS, to a base station. The base station can transmit location information about an MBS MAP, regarding the MBS requested by the terminal, to the terminal. Accordingly, service can be consistently performed.

Figure 9:
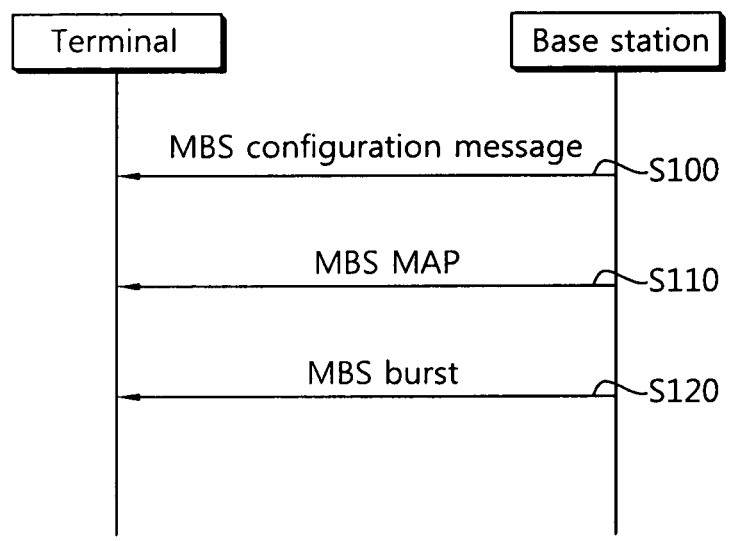
FIG. 9 is a flowchart illustrating a method of transmitting MBS information according to an embodiment of the present invention.

FIG. 9 is a flowchart illustrating a method of transmitting MBS information according to an embodiment of the present invention.

Referring to FIG. 9, a base station transmits an MBS configuration message to a terminal at step S100. The MBS configuration message can be an S-SFH. The MBS configuration message includes an MBS transmission indicator indicative of whether an MBS MAP has been transmitted and an MBS MAP indicator indicative of an MBS MAP. The MBS configuration message can further include information about an MBS region. The information about the MBS region includes location information about a single MBS region and the transmission parameter of the MBS region. In an alternative, the information about the MBS region includes the location information about a plurality of MBS regions and the transmission parameters of the MBS regions. The base station transmits an MBS MAP on the basis of the MBS MAP indicator at step S110. The MBS MAP includes MBS-related control information change indication and indicates an MBS burst. In the case in which a multi-carrier system is supported, the MBS MAP can be transmitted through not only a primary carrier, but also a secondary carrier. The base station transmits an MBS burst, indicated by the MBS MAP, to the terminal at step S120.

While some exemplary embodiments of the present invention have been described with reference to the accompanying drawings, those skilled in the art can change and modify the present invention in various ways without departing from the essential characteristic of the present invention. Accordingly, the disclosed embodiments should not be construed to limit the technical spirit of the present invention, but should be construed to illustrate the technical spirit of the present invention. The scope of the technical spirit of the present invention is not limited by the embodiments. The scope of the present invention should be interpreted according to the following appended claims. Accordingly, the present invention should be construed to cover all modifications or variations induced from the meaning and scope of the appended claims and their equivalents.

What is claimed is:

1. A method of transmitting Multicast Broadcast Service (hereinafter referred to as MBS) by a base station, the method comprising:
   transmitting, to a terminal, information regarding an MBS region assigned to MBS-related information;
   transmitting MBS configuration information including the MBS MAP related information to the terminal;
   transmitting an MBS MAP to the terminal on the basis of the MBS configuration information, wherein the MBS MAP includes MBS information and a control information change indication indicating whether control information included in a secondary superframe header (S-SFH) is to be changed in this MBS Scheduling Interval (MSI); and
   transmitting MBS data to the terminal through the MBS region to the terminal,
   wherein a time offset at which the changed control information is to be received is determined based on the MBS MAP.

2. The method of claim 1, wherein the MBS configuration information includes the location information of the MBS region and information about modulation and coding of the MBS region.

3. The method of claim 1, wherein the information about the MBS region further includes locations and transmission parameters for a plurality of MBS regions.

4. The method of claim 1, wherein:
   the information about the MBS MAP includes information about whether the MBS MAP is expected to be transmitted and information about a transmission location of the MBS MAP, and
   the terminal determines whether to decode the MBS MAP using the information about whether the MBS MAP is expected to be transmitted.

5. The method of claim 1, wherein the MBS configuration information is included in a superframe header (SFH).

6. The method of claim 1, wherein the MBS MAP indicates at least one next MBS MAP.

7. A method of receiving MBS by a terminal, comprising:
   receiving, from a base station, information regarding an MBS region assigned to MBS-related information;
   receiving MBS configuration information including the MBS MAP related information from the base station;
   receiving, from the base station, an MBS MAP on the basis of the MBS configuration information, wherein the MBS MAP includes MBS information and a control information change indication indicating whether control information included in a secondary super frame header (S-SFH) is to be changed in this MBS Scheduling Interval (MSI); and
   receiving, from the base station, MBS data through the MBS region,
   wherein a time offset at which the changed control information is to be received is determined based on the MBS MAP.

8. The method of claim 7, further comprising receiving the second MBS control information from the base station.

9. The method of claim 7, wherein:
the base station belongs to at least one MBS zone,
the MBS data correspond to a flow identifier (Flow ID; a FID) of specific contents, and
the FID corresponds to the at least one MBS zone.

10. The method of claim 7, wherein the MBS MAP indicates an MBS MAP included in the second MBS control information.

11. The method of claim 7, wherein the information about the MBS region includes location information about the MBS region indicates a subframe including the MBS region, within a superframe.

12. The method of claim 11, wherein the location information about the MBS region and the information about the MBS MAP have a bitmap format.

13. The method of claim 7, wherein:
the MBS is received through a plurality of carriers,
the MBS control information is received through a first carrier, and
the MBS control information further includes at least one of information about an MBS region of the first carrier and information about an MBS region of a second carrier.

14. The method of claim 13, wherein the MBS control information further comprises information about an MBS MAP of the second carrier.

15. The method of claim 1, wherein the MBS information includes an identifier of an MBS (MBS ID) the MBS data that provides and a front identifier (FID) of the MBS data.

16. The method of claim 15, wherein the MBS data is specified by a combination of the ID of the MBS and the FID of the MBS data.

17. The method of claim 1, wherein:
the MBS configuration information is system information about the base station, and
the MBS configuration information further comprises an indicator indicating that the MBS region is used for any one of unicast, MBS, and unicastmulticast broadcast service.

18. The method of claim 1, wherein the MBS configuration information is transmitted over a superframe immediately right before a position where an MBS scheduling interval (MSI) starts.

* * * * *